United States Patent Office 3,177,186
Patented Apr. 6, 1965

3,177,186
CRYSTALLIZABLE POLYMERS OF t-BUTYL
ACRYLATE AND METHACRYLATE
Mary Lucy Miller, New York, N.Y., assignor to American
Cyanamid Company, Stamford, Conn., a corporation
of Maine
No Drawing. Filed June 7, 1963, Ser. No. 286,293
6 Claims. (Cl. 260—89.5)

This invention relates to the preparation of crystallizable polyesters. More specifically, the present invention relates to a novel process for preparing crystallizable polymers of tertiary butyl acrylate and tertiary butyl methacrylate and to a procedure for production of crystalline poly(acrylic acid) by the further treatment of the acrylate polymers.

Briefly, the invention comprises the preparation of polymers having an ordered molecular arrangement characteristic of crystallinity by reacting monomers of the group consisting of tertiary butyl acrylate and tertiary butyl methacrylate in the presence of n-butyl lithium as a catalyst. The crystallizable polymer obtained may crystallize during the course of polymerization or it may subsequently be converted to the solid crystalline polymer by suitable treatment with agents like acetone. In a further aspect, the ester group of the crystallizable polymers of tertiary butyl acrylate or tertiary butyl methacrylate may be converted to acid groups to form crystallizable polyacrylic acid or polymethacrylic acid, respectively. This may be accomplished, for example, by decomposing the ester groups of the polymer to carboxyl groups in the presence of a suitable acid. The crystallizable polymers are then allowed to set, either alone or in contact with water or other suitable solvent or swelling agent in order to further enhance crystallization.

As a still further aspect, the crystallizable polyesters in the polyacids derived from the polyester may be subsequently treated, for example, by refluxing with acid and an excess of alcohol other than tertiary butyl alcohol to produce the corresponding polyesters which differ from the polyester initially prepared.

It is an object of the present invention to provide a novel method for preparing crystallizable and crystalline polymers of tertiary butyl acrylate and tertiary butyl methacrylate. It is still another object of the invention to provide a method of making crystallizable polymers wherein crystallizable polymers of this group prepared according to the invention are employed as intermediates. It is a further object of the instant invention to provide a method for the production of crystalline poly-(acrylic acid). Other objects and advantages will become apparent to those skilled in the art upon reading the more detailed description of the invention set forth hereinbelow.

In carrying out the process, the ester monomer, in a pure state, is introduced into a suitable vessel and mixed together with n-butyl lithium as a catalyst. The catalyst is preferably introduced as a solution in a suitable hydrocarbon solvent. According to my discovery, the n-butyl lithium catalyst may be employed alone or it may be employed in conjunction with a fine dispersion of metallic lithium, the procedure for the preparation and the technique for the use of which is described in my U.S. Patent No. 3,088,939. In some instances, for example, where the reaction has been contaminated, the presence of n-butyl lithium in combination with metallic lithium dispersion as cocatalysts is advantageous and is preferred over the use of lithium alone.

An inert atmosphere is maintained throughout the polymerization reaction. The polymerization occurs gradually and is allowed to proceed to a substantially solid phase. If desired, the polymerization system may utilize a suitable liquid medium which preferably behaves as a solvent for the monomer. However, a solvent is not necessary as polymerization of the monomer to the ordered structural arrangement of crystallinity occurs in the presence of the n-butyl lithium and the small amounts of solvent therefor which may be present.

The n-butyl lithium employed as the catalyst in the present invention may be obtained commercially or it may be prepared by the reaction of n-butyl chloride with lithium metal. Based on the weight of the monomeric compound, amounts of from about 0.01% to about 5% by weight of the catalyst may be employed although an amount of from about 0.05% to about 1.0% by weight is more satisfactory and is preferably used. As noted hereinabove, the catalyst is preferably employed in solution in any one of various substantially inert organic solvents such as hexane, heptane, petroleum ether, and the like.

A substantial proportion of the polymer which forms has a crystallizable or ordered molecular structural arrangement as distinguished from an amorphous polymer of random molecular arrangement in which there is little or no order in the manner in which the molecules are arranged.

I have discovered that n-butyl lithium has the unexpected capacity to form crystalline polymers of tertiary butyl acrylate and tertiary butyl methacrylate, i.e. polymers which have a predominant number of the monomer units in the polymer structure or chain arranged in a regular repeating configuration. This property is not obtained with free radical type catalysts.

As mentioned heretofore, the process of the present invention may employ the monomer alone with n-butyl lithium dispersions dissolved in a small amount of solvent or the system may utilize a polymerization medium which is preferably a solvent for the monomer. When a polymerization medium is utilized, it is necessary that it be inert to the polymerization reaction taking place. Among the solvents which may be used advantageously are hexane, heptane, octane, or other aliphatic solvents having from 4 to 10 carbon atoms, for example, or mixtures thereof, and various other available compounds known to be substantially inert, such as petroleum ether. The amount of solvent, when used, is not critical and may vary in amounts up to 80% or more of the weight of the monomer although practical limitations are generally imposed on amounts exceeding about 75% by weight of the monomer. It will be apparent that the amount of solvent will be governed by the amount of solids content of polymeric material desired therein. These solvents may be used either singly or in combination with one another.

In the practice of the process of the present invention, the conditions of reaction may be varied rather extensively. For example, one may utilize temperatures from about −90° C. up to about room temperature. At the temperatures in the upper part of the range, to avoid excess exotherm, it is necessary to add the catalyst at a slow rate. Consequently, it is desired as a practical matter to avoid higher temperatures. The preferred temperature range is between about 0° C. and about −70° C. Pressure is not a critical factor in carrying out the instant process inasmuch as atmospheric pressure, super-atmospheric pressure or sub-atmospheric pressure may be utilized. As a practical matter, atmospheric pressure is preferred.

Following polymerization, the crystalline polymer may be isolated by extracting the polymeric material with a compound which is a solvent for the noncrystalline polymer but at the same time a nonsolvent for the crystalline polymer. An example of such a solvent is acetone. It will be apparent that for some uses, the separation of the crystalline polymer from the amorphous polymer formed therewith may not be necessary or desirable. Where high polymer purity is desired the addition of a small amount of alcohol, e.g. methanol, as a part of the solvent or as a precipitant for the polymer will destroy the unused catalyst.

The crystallizable polymer of tertiary butyl acrylate is a highly useful resinous composition. It is also valuable as an intermediate in the preparation of derivatives thereof. For example, polyacid derivatives of tertiary butyl acrylate may be obtained by hydrolyzing the crystallizable or crystalline polymer containing the ester groups in an acid medium within a wide temperature range, e.g. between about 20° C. and 210° C. This reaction decomposes the ester groups of the polymer to produce acrylic acid groups, i.e. to form crystallizable polyacrylic acid which is also a highly useful resinous material. Isobutylene gas is evolved in the reaction. Additionally, the crystallizable polyacrylic acid so produced may be employed as an intermediate in the preparation of a different crystallizable polymeric ester, for example, polymethacrylate or polyethacrylate and the like, by esterifying the crystallizable polyacrylic acid. This esterification may be accomplished, for example, by refluxing the polyacrylic acid with an excess of a suitable alcohol, methyl, ethyl, propyl or isopropyl alcohol in the presence of an acid, such as sulfuric acid, hydrochloric acid, acetic acid, propionic acid, p-toluene sulfuric acid, and the like. The reaction product, when the crystallizable polyacrylic acid intermediate is utilized, is crystallizable poly-n-butyl acrylate. The poly(tert.-butyl esters) can also be converted to other crystallizable esters by a similar procedure which results in transesterification. In a like manner, poly-tertiary butyl methacrylate produced according to the invention may be post-treated in similar chemical reactions which do not break the —C—C—C— chain of the polymer backbone to produce corresponding products.

The modification of these polymers without loss in their crystallizable property is possible because the ordered arrangement in the polymer which makes crystallization possible resides in the —C—C—C— linkages of the backbone with respect to the side group orientation. Therefore, any reaction on the side groups that does not break the —C—C—C— linkages of the polymer backbone will not destroy the ability of the polymer to crystallize. Each of the crystallizable polymers derived from tertiary butyl acrylate and tertiary butyl methacrylate, as well as the crystallizable polymers derived from the further modification of these polymers, are highly useful resinous compositions. They find application and applicability, for example, as adhesives, molding compositions, laminating compositions, in fiber forming or in the treatment of various materials, such as textiles which are made up either of natural or synthetic fibers including wool, linen, cotton, nylon and other synthetics or in the treatment of paper or paper pulp, wood or leather.

The following examples are set forth for purposes of illustration only and are not to be construed as limitations on the present invention except as set forth in the appended claims. All parts and percentages are by weight unless otherwise indicated.

EXAMPLE 1

Equal quantities of pure tertiary butyl acrylate and hexane are introduced into a suitable reaction vessel and mixed in a dry, oxygen-free atmosphere. The mixture is cooled to −70° C. in a Dry Ice-butanol mixture. A solution of n-butyl lithium in a hydrocarbon medium (petroleum ether) is added. 0.5 percent, by weight, of catalyst is used, although from about 0.02% to 1% by weight based on monomer is a convenient amount of catalyst. A gelatinous precipitate appears at once; more forms over the next hour. On warming to room temperature, the contents of the vessel are solid. The polymer is slurried with a methanol-acetone mixture (1:1) twice. It is then extracted twice with cold acetone and twice with hot acetone. The acetone insoluble polymer, from 15 to 45% of the total is crystalline as shown by X-ray. The fraction of the polymer which is soluble in hot acetone contains minor amounts of crystallinity. Although equal quantities of tertiary butyl acrylate and hexane are employed in the foregoing example, the monomer to hexane mixture may range from 100% monomer to 90% hexane. Initial temperatures of the order of 0 to −80° C. are preferred because of the exotherm of the reaction. Room temperature is satisfactory at later stages of the reaction.

EXAMPLE 2

To a suitable reaction vessel are added equal amounts of tertiary butyl methacrylate and hexane in a dry, oxygen-free atmosphere. The mixture is cooled to −70° C. and a petroleum ether solution of n-butyl lithium is added in a concentration of 0.9%, by weight, based on the weight of the methacrylate. The reaction vessel is warmed to room temperature after 2 hours and the contents thereof are then solid polymer. The polymer is twice slurried with a 1:1 methanol-acetone mixture and then extracted twice with cold acetone and twice with warm acetone. The portion of the polymer which is insoluble in the acetone (40%) is subjected to X-ray analysis. Measurable d-spacings indicative of crystallinity are observed.

EXAMPLE 3

30 cc. of hexane and 20 cc. of pure dry tertiary butyl acrylate are mixed and approximately 100 milligrams of lithium (as a 24% dispersion in petrolatum) is added. The mixture is allowed to stand at room temperature 20 hours. It is then cooled to −70° C. and 1 cc. of a 15% solution of n-butyl lithium in petroleum ether added. After 2 hours at −70° C., the contents of the flask are solid with polymer. The polymer is extracted 2 times with a boiling 1:1 mixture of methanol and acetone to remove catalyst. The polymer is then extracted 3 times with boiling acetone to remove any amorphous polymer present. About 40% of the total polymer is found insoluble in boiling acetone and gives a crystalline X-ray diffraction pattern.

EXAMPLES 4–10

Purified monomers are dried over calcium hydride and distilled to a recovery tube containing twice their volume of dry hexane. The tubes are sealed, cooled to −70° C. and a volume of n-butyl lithium solution (15% in petroleum ether) equal to approximately 1/10 of the volume of the monomer added. The polymer which forms is worked up as in Example 2 and submitted to examination by X-ray diffraction. The monomers employed and the character of the polymer obtained are set forth below in Table I.

*Table I*

| Example | Monomer | Results |
| --- | --- | --- |
| 4 | Cyclohexyl acrylate | Non-crystalline polymer. |
| 5 | n-Butyl acrylate | Gummy polymer. |
| 6 | Isobutyl acrylate | Do. |
| 7 | Sec. butyl acrylate | Do. |
| 8 | Benzyl acrylate | Non-crystalline polymer. |
| 9 | Styrene | Do. |
| 10 | t-Butyl acrylate | Crystalline polymer. |

EXAMPLE 11

To 15 parts of the crystalline poly(t-butyl acrylate) produced in Example 1, are added 300 parts of dioxane. The mixture is placed in a suitable vessel and allowed to reflux for 1 hour. Twenty-five parts of concentrated hydrochloric acid and 40 parts of water are then added and the resultant mixture is then refluxed for 18 hours. Poly(acrylic acid) is recovered and when subjected to X-ray analysis, exhibits clear, dark, measurable *d*-spacings indicating that the polymer is crystalline.

EXAMPLE 12

Fifteen (15) parts of the hot acetone soluble portion of the poly(t-butyl acrylate) (i.e. the crystallizable portion) produced in Example 1 are treated according to the procedure of Example 11. The resultant crystallizable poly-acrylic acid), upon setting alone for 24 hours, becomes crystalline as evidenced by the observation of measurable *d*-spacings when the polymer is subjected to X-ray analysis.

This application is a continuation-in-part of my abandoned application Serial No. 761,290, filed September 16, 1958.

I claim:

1. A method of preparing a crystalline homopolymer comprising mixing a monomeric compound selected from the group consisting of tertiary butyl acrylate and tertiary butyl methacrylate with a catalyst consisting essentially of a substantially inert organic solvent solution of n-butyl lithium in amounts ranging from about 0.01% to 5.0%, by weight, based on the weight of said monomeric compound, polymerizing the resultant mixture at a temperature ranging from about −90° C. to about room temperature in an inert atmosphere and separating the resultant crystalline polymeric product.

2. The method of claim 1 wherein the monomeric compound is dissolved in an organic medium which is a solvent for said compound, said medium being selected from the group consisting of aliphatic solvents having from 4–10 carbon atoms and petroleum ether.

3. A method of preparing a crystalline homoploymer comprising mixing a monomeric compound consisting essentially of tertiary butyl acrylate with a catalyst system consisting essentially of a substantially inert organic solvent solution of n-butyl lithium in amounts ranging from about 0.05% to 1.0%, by weight, based on the weight of said monomeric compound, polymerizing the resultant mixture at a temperature ranging from about −90° C. to about room temperature in an inert atmosphere and separating the resultant crystalline polymeric product.

4. A method of preparing a crystalline homopolymer comprising mixing a monomeric compound consisting essentially of tertiary butyl methacrylate with a catalyst system consisting essentially of a substantially inert organic solvent solution of n-butyl lithium in amounts ranging from about 0.05% to 1.0%, by weight, based on the weight of said monomeric compound, polymerizing the resultant mixture at a temperature ranging from about −90° C. to about room temperature in an inert atmosphere and separating the resultant crystalline polymeric product.

5. A method of preparing crystallizable poly(acrylic acid) which comprises mixing a monomeric compound consisting essentially of tertiary butyl acrylate with a catalyst system consisting essentially of a substantially inert organic solvent solution of n-butyl lithium in amounts of from about 0.05% to about 1.0%, by weight, based on the weight of said monomeric compound, polymerizing the resultant mixture at a temperature ranging from about −90° C. to about room temperature in an inert atmosphere, separating the resultant crystallizable reaction product, and hydrolyzing said reaction product in an acid medium at a temperature ranging from about 20° C. to about 210° C. until the ester groups of said polymeric reaction product are substantially decomposed to carboxyl groups.

6. A method of preparing crystalline poly(acrylic acid) which comprises mixing a monomeric compound consisting essentially of tertiary butyl acrylate with a catalyst system consisting essentially of a substantially inert organic solvent solution of n-butyl lithium in amounts of from about 0.05% to about 1.0%, by weight, based on the weight of said monomeric compound, polymerizing the resultant mixture at a temperature ranging from about −90° C. to about room temperature in an inert atmosphere, separating the resultant crystalline reaction product, and hydrolyzing said reaction product in an acid medium at a temperature ranging from about 20° C. to about 210° C. until the ester groups of said polymeric reaction product are substantially decomposed to carboxyl groups.

References Cited by the Examiner

UNITED STATES PATENTS

| | | | |
|---|---|---|---|
| 2,977,337 | 3/61 | Schuller | 260—88.7 |
| 3,088,939 | 5/63 | Miller | 260—89.5 |

JOSEPH L. SCHOFER, *Primary Examiner.*

DONALD E. CZAJA, *Examiner.*